(12) United States Patent
Morrison

(10) Patent No.: US 8,780,170 B2
(45) Date of Patent: Jul. 15, 2014

(54) VIDEO CONFERENCING DISPLAY DEVICE

(75) Inventor: Gerald Morrison, Calgary (CA)

(73) Assignee: SMART Technologies ULC (CA)

( * ) Notice: Subject to any disclaimer, the term of this patent is extended or adjusted under 35 U.S.C. 154(b) by 214 days.

(21) Appl. No.: 13/436,064

(22) Filed: Mar. 30, 2012

(65) Prior Publication Data

US 2012/0249724 A1 Oct. 4, 2012

Related U.S. Application Data

(60) Provisional application No. 61/470,440, filed on Mar. 31, 2011.

(51) Int. Cl.
*H04N 7/14* (2006.01)
(52) U.S. Cl.
USPC ..................................... 348/14.16; 348/14.08
(58) Field of Classification Search
USPC ....................... 348/14.07, 14.08, 14.01, 14.16
See application file for complete search history.

(56) References Cited

U.S. PATENT DOCUMENTS

| | | | |
|---|---|---|---|
| 5,400,069 A | 3/1995 | Braun et al. | |
| 5,438,357 A | 8/1995 | McNelley | |
| 5,550,754 A * | 8/1996 | McNelley et al. | 348/14.01 |
| 2008/0297586 A1 | 12/2008 | Kurtz et al. | |
| 2009/0278913 A1 | 11/2009 | Rosenfeld et al. | |
| 2012/0169838 A1* | 7/2012 | Sekine | 348/14.16 |
| 2013/0106983 A1* | 5/2013 | Fritsch et al. | 348/14.08 |

FOREIGN PATENT DOCUMENTS

WO 2007/087142 A2 8/2007

OTHER PUBLICATIONS

Yu-Pao Tsai et al., "Real-Time Software Method for Preserving Eye Contact in Video Conferencing", Journal of Information Science and Engineering, vol. 20 (5), Sep. 200, pp. 1001-1017.
Transmittal; International Search Report; and the Written Opinion of the International Searching Authority for International Application No. PCT/CA2012/000317 with a mailing date of Jul. 11, 2012.

* cited by examiner

*Primary Examiner* — Olisa Anwah
(74) *Attorney, Agent, or Firm* — Katten Muchin Rosenman LLP

(57) ABSTRACT

A video conferencing display device a display panel, at least one imaging device and processing structure. The at least one imaging device has a field of view aimed at an inner surface of the display panel and captures images through the display panel such that when a user is positioned adjacent an outer surface of the display panel, the user appears in the captured images. The processing structure communicates with the at least one imaging device and processes the captured images to create a direct eye image for transmission to a remote device over a network.

9 Claims, 12 Drawing Sheets

VIDEO CONFERENCING DISPLAY DEVICE

CROSS-REFERENCE TO RELATED APPLICATIONS

This application claims the benefit of U.S. Provisional Application No. 61/470,440 to Morrison et al. filed on Mar. 31, 2011 and entitled "Interactive Input System", the entire content of which is incorporated herein by reference.

FIELD OF THE INVENTION

The present invention relates generally to video conferencing and in particular, to a video conferencing display device.

BACKGROUND OF THE INVENTION

Video conferencing systems that allow two-way video communication between two or more users or conferees at different sites in real-time are known. Typically, each conferee's site is equipped with a video camera and a display. The video camera and display are coupled to a communications network. In this manner, video signals captured by the video camera can be transmitted over the communications network to one or more displays at remote sites and video signals received from the communication network that were transmitted by one or more video cameras at a remote sites can be displayed. Typically, a microphone and a speaker are also present at each site to record and playback corresponding audio signals respectively, in a generally synchronized manner.

One of the most commonly encountered problems with video conferencing systems is the "off camera" problem, also referred to as the "parallax effect", whereby conferees appear as being unable to establish direct eye contact while looking at their respective displays. Ideally, the video camera is placed in a space directly in front of each conferee. Unfortunately however, the display also occupies space in front of each user. As a result, the video camera is placed away from its ideal location, typically just above, just below, or just to the side of the display. If the video camera is not placed directly in front of the user, the user will appear to be looking off to the side, above or below the line of sight that corresponds to direct eye contact, depending on the placement of the video camera. This "off camera" or "parallax effect" is undesirable.

An exemplary conventional video conferencing system 10 is shown in FIG. 1. As can be seen, at a local site an imaging device such as video camera 22-1 connected to a computer 24-1 is placed above a display 26-1 for use by a first conferee U1. Similarly, at a remote site, an imaging device such as video camera 22-2 connected to computer 24-2 is placed above a remote display 26-2 for use by a second conferee U2. The two computers 24-1 and 24-2 communicate via a communications network 28 such as for example a local area network (LAN) or a wide area network (WAN) such as for example the Internet.

Displays 26-1 and 26-2 are standard liquid crystal display (LCD) or cathode ray tube (CRT) monitors. Video cameras 22-1 and 22-2 can be stand-alone cameras or embedded webcams that are formed integrally with displays 26-1 and 26-2 respectively. Each computer 24-1 and 24-2 processes captured images from its respective video camera 22-1 and 22-2 for transmission.

As noted above, video conferencing system 20 depicted in FIG. 1 suffers from the 'off camera' problem or 'the parallax effect' problem. The conference users U1 and U2 would appear unable to establish direct eye contact while looking at their respective displays 26-1 and 26-2.

Known approaches to counteract this effect have sometimes involved placing beam-splitters or partial mirrors between the display and the conferee so that the camera records a reflected image of the conferee while the conferee is simultaneously looking directly at a display. One such approach is described in International PCT Application Publication No. WO 2007/087142 to Hunter et al.

Other approaches utilize a wide-angle lens camera, a homing device placed on a conferee and corresponding sensors, and use image manipulation techniques to provide the appearance of eye contact. One such technique is described in U.S. Pat. No. 5,438,357 to McNelley.

Unfortunately, the above described approaches often entail costs associated with additional hardware such as beam splitters or mirrors, wide-angle lens cameras, homing devices, and the associated costs. Accordingly, it is the object to provide a novel video conferencing display device.

SUMMARY OF THE INVENTION

Accordingly, in one aspect there is provided a video conferencing display device comprising a display panel, at least one imaging device having a field of view aimed at an inner surface of the display panel, the at least one imaging device capturing images through the display panel such that when a user is positioned adjacent an outer surface of the display panel the user appears in the captured images, and processing structure in communication with the at least one imaging device, said processing structure processing the captured images to create a direct eye image for transmission to a remote device over a network.

In one embodiment, the processing structure is configured to receive images from the remote device over the network, the received images being displayed on the display panel. The display panel may be a transparent display panel such as a liquid crystal display panel or an organic light emitting diode panel.

In one embodiment, the video conferencing display device is operable in an image capture mode and a display mode. The video conferencing display device may further comprise at least one film having an electrically controllable transparency positioned intermediate the at least one imaging device and the display panel. The film layer may be a polymer-disbursed liquid crystal film layer that is substantially transparent during operation in the image capture mode and non-transparent during operation in the display mode.

In one embodiment, the display panel and the at least one imaging device are accommodated by a housing with the at least one imaging device being spaced from the display panel. The processing structure may be accommodated by the housing or positioned outside of the housing.

According to another aspect there is provided a video conferencing display device comprising a display panel, an illumination source providing illumination through the display panel such that when a user is positioned adjacent to an outer surface of the display panel, the user's eyes reflect illumination from the illumination source back through the display panel, at least one first imaging device having a field of view aimed at an inner surface of the display panel, each first imaging device capturing images through the display panel including illumination reflected by the user's eyes through the display panel, at least one second imaging device having a field of view aimed at an outer surface of the display panel, each second imaging device capturing images of the outer surface of the display panel such that when a user is positioned adjacent to the outer surface, an image of the user appears in the captured images, and processing structure in communication with the at least one first and at least one second imaging devices, said processing structure processing the images captured by each first imaging device to obtain eye tracking data and processing the images captured by each second imaging device using the eye tracking data to create a direct eye image for transmission to a remote device over a network.

According to yet another aspect there is provided a method comprising capturing images of a user positioned adjacent an outer surface of a display device using at least one imaging device having a field of view aimed at an inner surface of the display device, and processing the captured images to generate a direct eye image for transmission to a remote display device over a network.

According to yet another aspect there is provided a method comprising providing illumination towards an outer surface of a display device using a first illumination source, capturing images of a user positioned adjacent to the outer surface of the display device using at least one first imaging device having a field of view aimed at an inner surface of the display panel including illumination from the first illumination source reflected by the user's eyes towards the first imaging device, capturing images of the user positioned adjacent to the outer surface of the display device using at least one second imaging device having a field of view aimed at the outer surface of the display device, and processing images captured by the at least one first imaging device to obtain eye tracking data and processing the images captured by the at least one second imaging device using the eye tracking data to create a direct eye image for transmission to a remote device over a network.

According to still yet another aspect there is provided a display device comprising a display panel; and at least one imaging device having a field of view aimed at an inner surface of the display panel, the at least one imaging device capturing images through the display panel such that when a user is positioned adjacent an outer surface of the display panel the user appears in the captured images.

BRIEF DESCRIPTION OF THE DRAWINGS

Embodiments will now be described more fully with reference to the accompanying drawings in which.

DETAILED DESCRIPTION OF THE EMBODIMENTS

In the following, a video conferencing system having two or more video conferencing display devices is described. At least one of the video conferencing display devices comprises a display panel and at least one imaging device having a field of view aimed at an inner surface of the display panel. The imaging device captures images through the display panel such that when a user is positioned adjacent an outer surface of the display panel, the user appears in the captured images. The imaging device communicates captured images to a general purpose computing device for processing. The general purpose computing device communicates processed images to a remote display device over a communications network. As such, images of the user can be displayed on the remote display device thus creating the appearance of the user having direct eye contact with a user of the remote display device.

Figure 1:
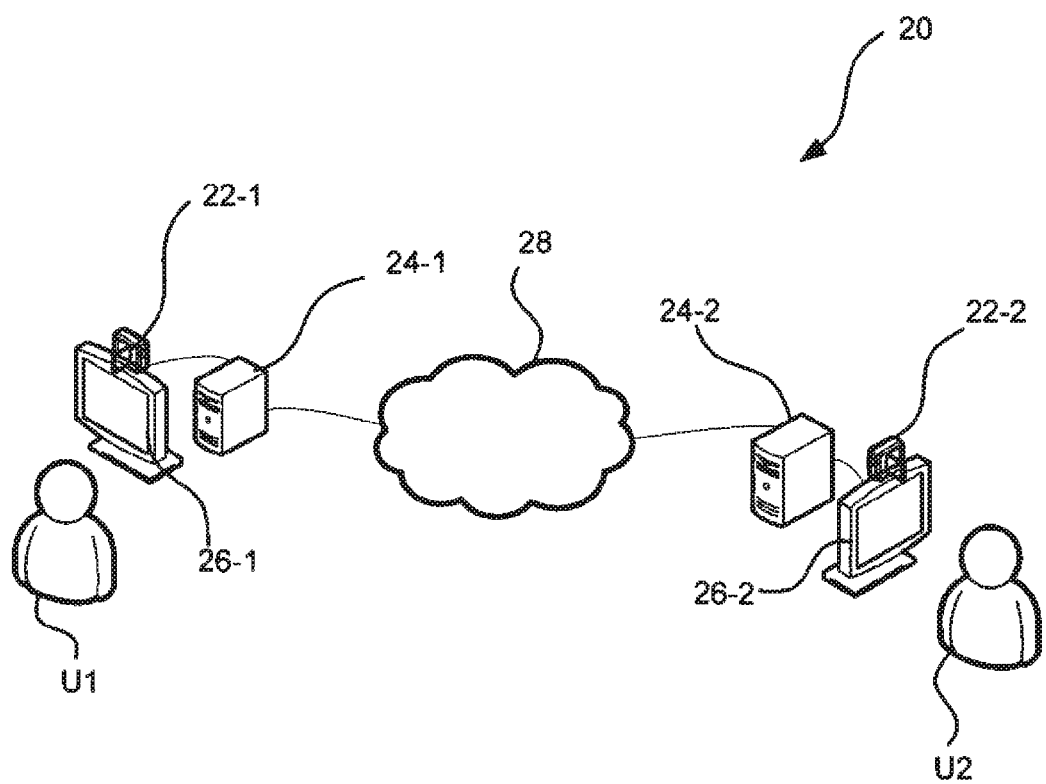
FIG. 1 is a schematic diagram of a prior art video conferencing system.
Figure 2:
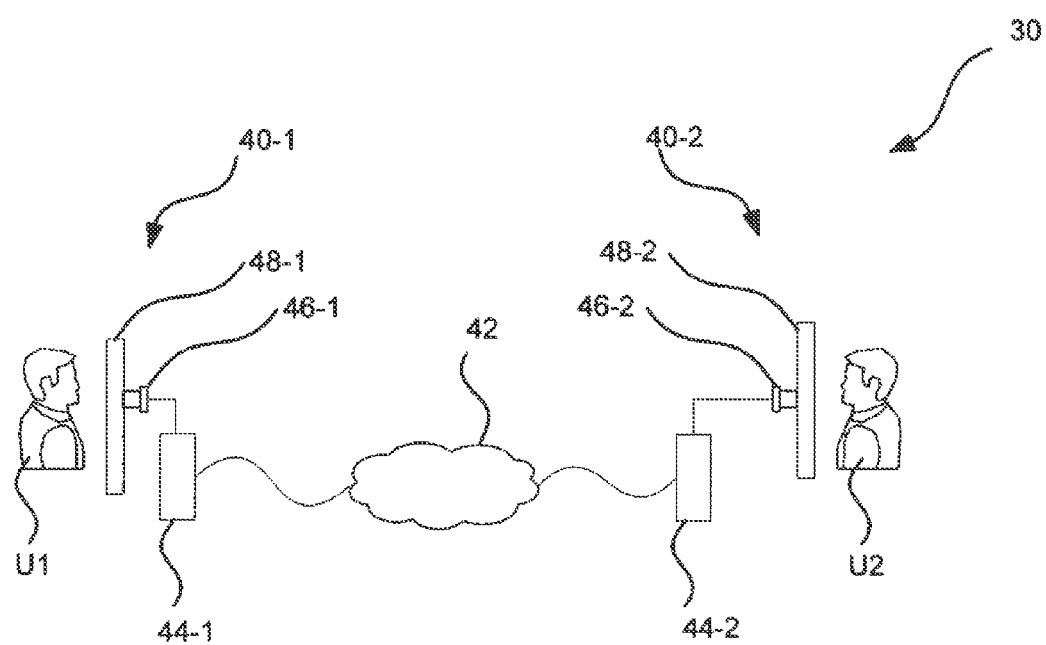
FIG. 2 is a schematic diagram of a video conferencing system.

FIG. 2 shows a schematic diagram of a video conferencing system 30. As can be seen, video conferencing system 30 comprises a video conferencing display device 40-1 communicatively connected to a video conferencing display device 40-2 via a communications network 42. In this embodiment, video conferencing display devices 40-1 and 40-2 each comprise processing structure in the form of a general purpose computing device 44-1 and 44-2. Video conferencing display devices 40-1 and 40-2 also comprise imaging devices 46-1 and 46-2 positioned behind transparent display panels 48-1 and 48-2 for capturing images of users or conferees U1 and U2, respectively. Each general purpose computing device 44-1 and 44-2 has a network interface card (not shown) providing interconnections to the communications network 42 such as for example an Ethernet network interface card (NIC), a wireless network interface card (WiFi, Bluetooth, etc.), a cellular radio frequency (RF) transceiver, etc. As is well known, network interface cards communicate with a gateway device such as for example a cable modem, a digital subscriber line (DSL) modem, an integrated digital services network (ISDN), etc. to provide a two-way communications channel over communications network 42.

During operation, users U1 and U2 enter into a video conferencing session via communications network 42. For user U1, image data is captured by imaging device 46-1 and communicated to the general purpose computing device 44-1. The general purpose computing device 44-1 in turn communicates the image data over communications network 42 to general purpose computing device 44-2. The general purpose computing device 44-2 processes the received image data for display on display panel 48-2. As such, user U2 is presented with an image of user U1. As will be appreciated, image data for user U2 is similarly captured by imaging device 46-2 and communicated over communications network 42 for display on display panel 48-1. As such, users U1 and U2 are able to partake in a video conferencing session with the appearance of direct eye contact with one another.

Figure 3:
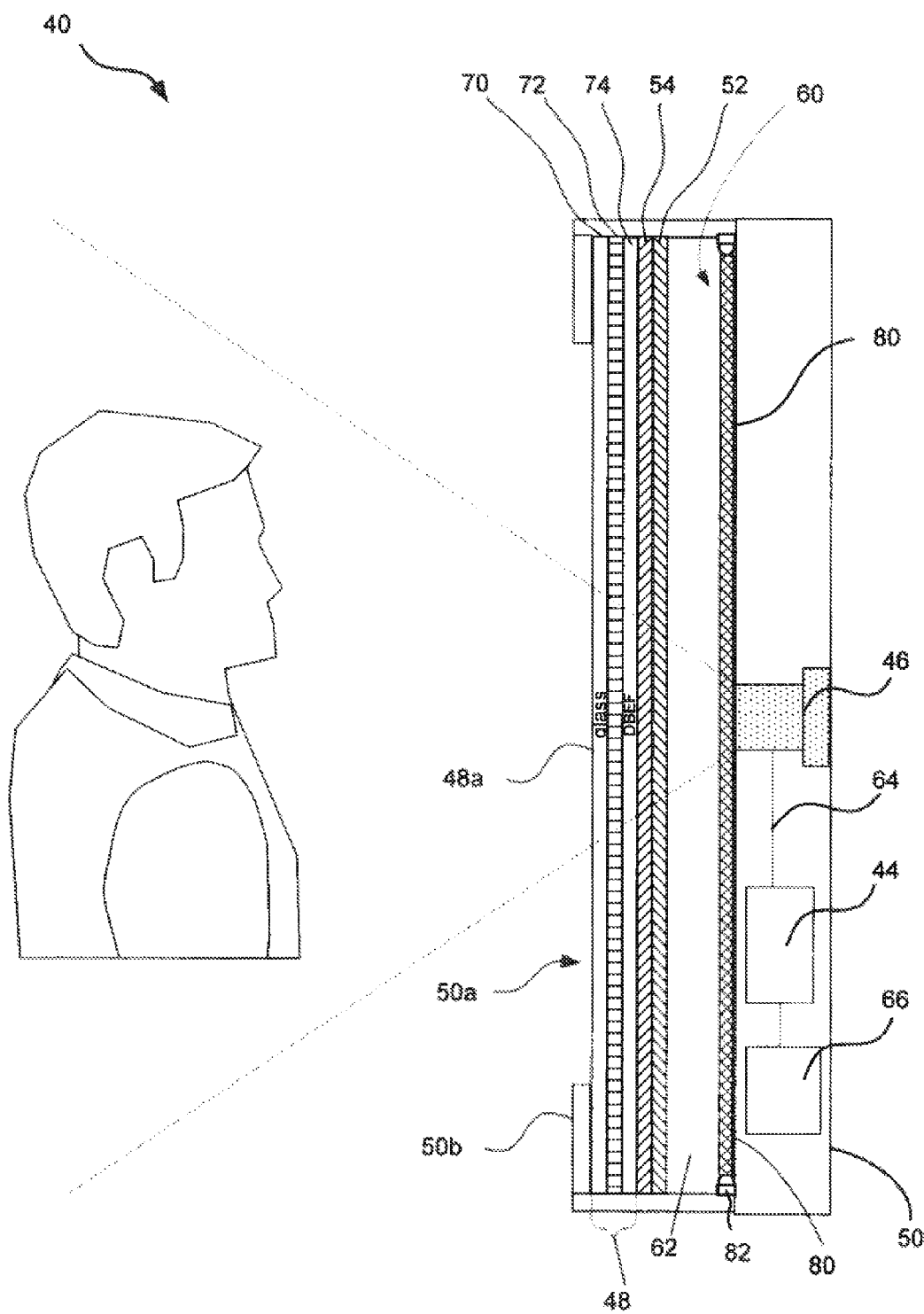
FIG. 3 is a cross-sectional view of a video conferencing display device forming part of the video conferencing system of FIG. 2.

FIG. 3 further illustrates one of the video conferencing display devices 40 (e.g., video conferencing display device 40-1 or 40-2). As can be seen, in this embodiment video conferencing display device 40 comprises a generally rectangular housing 50 having an opening 50a in its front or forward major surface that is surrounded by a bezel 50b. The housing 50 accommodates a layered arrangement of components positioned adjacent the opening 50a including, in the following order starting from furthest from the opening 50a, a support layer 52, a diffuser 54, and a display panel 48.

In this embodiment, the support layer 52 is formed of transparent acrylic or other suitable light transmissive material. The diffuser 54 and display panel 48 are also light transmissive. Positioned interior of the support layer 52 is a backlight illumination source 60 that provides backlight illumination to the display panel 48 in the form of visible light. In this embodiment, the backlight illumination source 60 is spaced from the support layer 52 thereby to define an interior space 62 within the housing 50.

An imaging device 46 is positioned interior of the illumination source 60 and is spaced from the display panel 48. The imaging device 46 is oriented such that its field of view (FOV) is aimed at the inner surface of the display panel 48. As the display panel 48, diffuser 54 and support layer 52 are light transmissive, the imaging device 46 is able to capture images of a user positioned in front of the outer surface 48a of the display panel 48. As will be appreciated, the terms "interior", "inner", and the like are relative terms that may change depending on the orientation of the video conferencing display device 40.

The imaging device 46 is connected to general purpose computing device 44 also accommodated by housing 50 via a data communication link such as a universal serial bus (USB) cable 64. The general purpose computing device 44 provides display data to a circuit block 66 which in turn provides the display data to the display panel 48 via an HDMI cable or other suitable connection (not shown). The display panel 48 in turn displays an image thereon. The general purpose computing device 44 also processes image data captured by the imaging device 46 to provide image data to a remote device via communications network 42.

The display panel 48 in this embodiment is a generally planar, liquid crystal display (LCD) panel comprising a layer of protection glass 70, a liquid crystal panel 72, and a brightness enhancing film 74 such as for example a dual brightness enhancing film (DBEF).

The backlight illumination source 60 in this embodiment comprises a light guide 80 and a plurality of light emitting diodes (LEDs) 82 positioned about the periphery of the light guide 80. The LEDs 82 emit visible light rays into the light guide 80, which in turn guides at least a portion of the visible light rays through the interior space 62 and support layer 52, towards the diffuser 54. The diffuser 54, in turn diffuses the visible light rays thereby to provide the display panel 48 with suitable backlighting and illuminate the image displayed thereon.

Interior space 62 defined between illumination source 60 and the support layer 52 is dimensioned so that that at least a portion of outer surface 48a of the display panel 48 delimited by the opening 50a falls within the FOV of the imaging device 46. In this manner, a user positioned in front of the outer surface 48a of the display panel 48 will be captured in images acquired by the imaging device 46.

Figure 4:
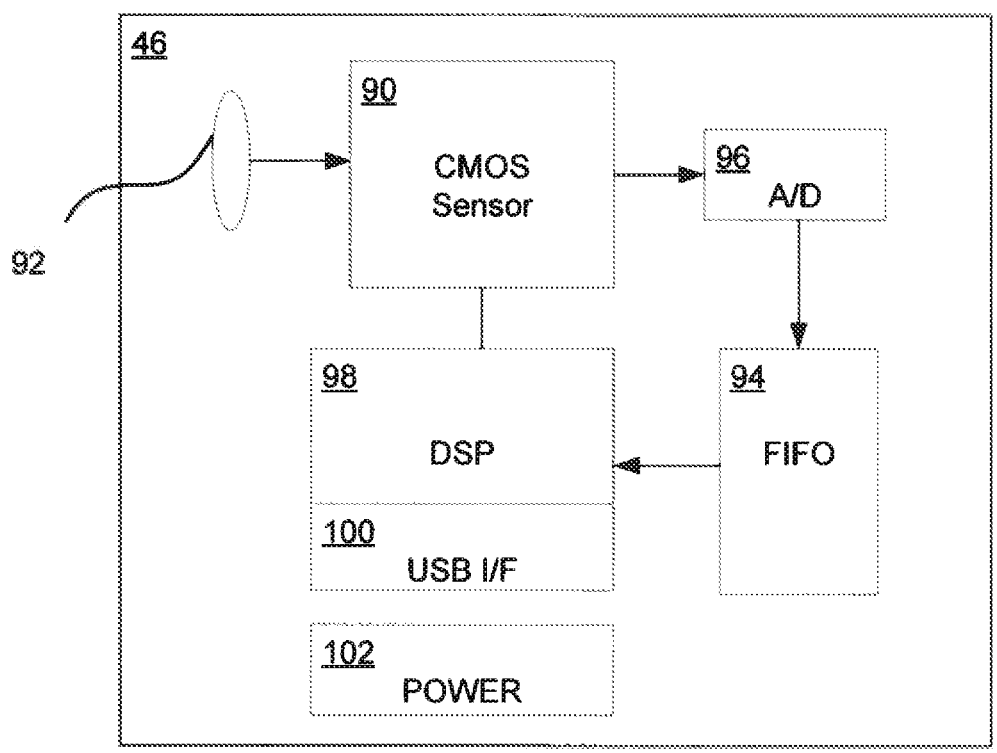
FIG. 4 is a schematic block diagram showing components of an imaging device forming part of the video conferencing display device of FIG. 3.

FIG. 4 shows components of the imaging device 46. As can be seen, in this embodiment imaging device 46 comprises a two-dimensional camera image sensor 90 such as for example a CMOS sensor, CCD sensor, etc., and an associated lens assembly 92. The image sensor 90 is interconnected to a first-in-first-out (FIFO) buffer 94 via an analog-to-digital (A/D) converter 96. The imaging device 46 also comprises a digital signal processor (DSP) 98, an input-output (I/O) interface 100 such as for example a USB port, as well as volatile and non-volatile memory (not shown). DSP 98 communicates image data acquired by image sensor 90 to the general purpose computing device 44 via the I/O interface 100. The imaging device components receive power from a power-supply 102.

In this embodiment, the imaging device 46 is a compact board level camera device manufactured by Imaging Development Systems GmbH of Oversulm, Germany under the part number UI-1226LE. The image sensor 90 is a CMOS image sensor configured for a 752×480 pixel sub-array that can be operated to capture image frames at high rates such as for example 30, 60, 100 frames per second (fps) or higher. The exposure time and frame rate of the imaging device 46 is controllable by the DSP 98 to permit operation in both dark rooms and well lit rooms.

General purpose computing device 44 in this embodiment is a personal computer or other suitable processing device or structure executing one or more applications programs. Thus, general purpose computing device 44 comprises, for example, a processing unit such as for example an Intel x86 based architecture, system memory (volatile and/or non-volatile), other non-removable and removable memory (e.g., a hard disk drive, RAM, ROM, EEPROM, CD-ROM, DVD, flash memory, etc.) and a system bus coupling the various components to the processing unit. The general purpose computing device 44 may also comprise a network connection to access shared or remote devices, one or more networked computing devices, and/or other network devices.

In this embodiment, the circuit block 66 comprises an interface circuit configured to receive display data and other input from the general purpose computing device 44 and a display driver circuit configured to output display data to the display panel 48.

Image data acquired by the imaging device 46 is sent to the general purpose computing device 44 via USB cable 64. In particular, the imaging device 46 captures image frames of the display panel 48 within the field of view of its image sensor 90 and associated lens assembly 92 at the frame rate established by the DSP clock signals. The general purpose computing device 44 polls the imaging device 46 at a set frequency (in this embodiment thirty (30) times per second) to obtain the image data. Each time the imaging device 46 is polled, image data is communicated to the general purpose computing device 44 for processing.

Figure 5:
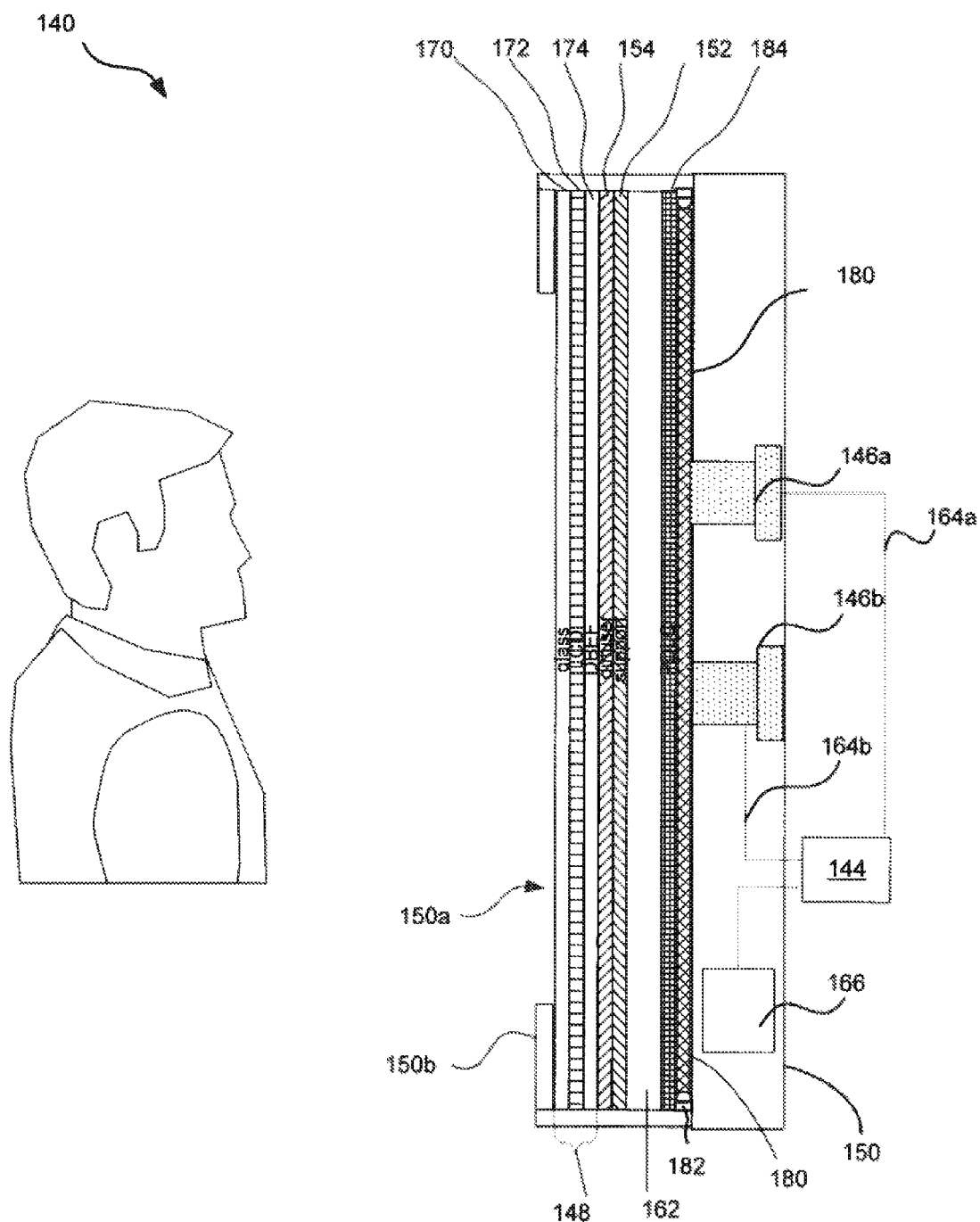
FIG. 5 is a cross-sectional view of another embodiment of a video conferencing display device.
Figure 6:
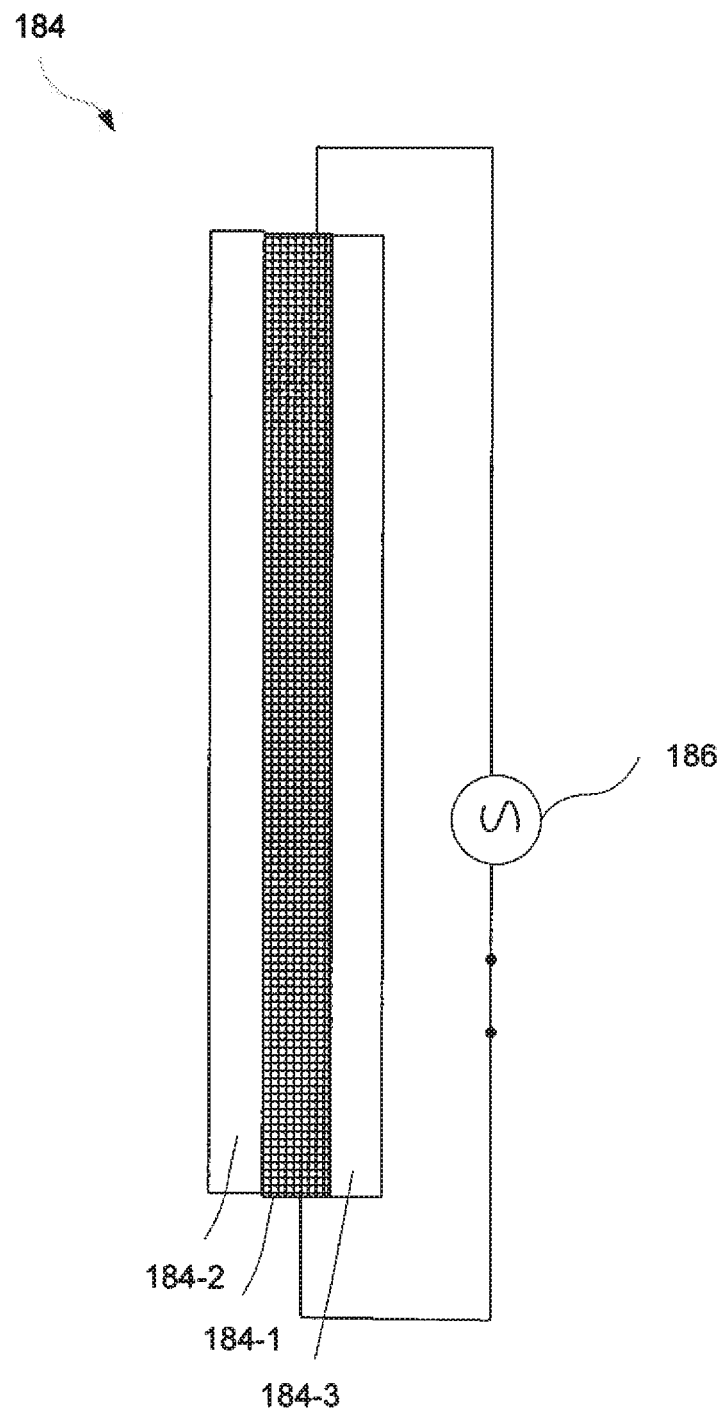
FIG. 6 is a cross-sectional schematic diagram of a film layer having an electrically controllable transparency forming part of the video conferencing display device of FIG. 5.

Turning now to FIGS. 5 and 6, another embodiment of a video conferencing display device is shown. In this embodiment, like reference numerals will be used to indicate like components of the first embodiment with a "100" added for clarity. As can be seen, the video conferencing display device 140 is similar to that of video conferencing display device 40. Video conferencing display device 140 however, further comprises a film layer 184 having an electrically controllable transparency such as for example polymer dispersed liquid crystal (PDLC) used to achieve a shuttering effect, specifics of which will be described below. Housing 150 encloses the film layer 184 and imaging devices 146a and 146b. The general purpose computing device 144 is positioned outside of housing 150. The video conferencing display device 140 is operable in two modes, namely a display mode and an image capture mode. In the event that no image capture is desired, the video conferencing display device 140 is conditioned to operate in the display mode in which case the imaging devices 146a and 146b are turned OFF, and the film layer 184 is operated as a diffusive element. In the event that image capture is desired, the video conferencing display device 140 is conditioned to operate in the image capture mode in which case the imaging devices 146a and 146b are turned ON, and the film layer 184 is conditioned to a transparent state by exciting film layer 184 via a power source 186.

FIG. 6 illustrates a simplified cross-sectional diagram of the film layer 184. In this embodiment, the film layer 184 is a polymer-dispersed liquid crystal (PDLC) film such as that manufactured by Scientsry Inc. of Richardson, Tex., U.S.A., and comprises a layer 184-1 formed of liquid crystal droplets dispersed in a solid polymer matrix. The layer 184-1 is positioned intermediate a pair of parallel substrates 184-2, 184-3 that are coated with a thin layer of a conducting material such as indium tin oxide (ITO). The orientation of the liquid crystal droplets in the layer 184-1 may be altered with controlled application of an electric field from power source 186. It is thus possible to controllably vary the intensity of transmitted light through the film layer 184.

In the unexcited state, the liquid crystal droplets in layer 184-1 are oriented in random fashion and thus the film layer 184 acts as a non-transparent diffusive element. An electric field applied from power source 186 causes the film layer 184 to operate in the excited state. In the excited state, the electric field applied from power source 186 orients the crystal droplets in a predetermined direction, such that the film layer 184 becomes substantially transparent. Thus, the film layer 184 allows light to pass through relatively unobstructed. As will be appreciated, the power source 186 may be selectively applied to the film layer 184 causing it to become transparent in the event the respective imaging devices 146a and 146b are required to capture image frames. When the imaging devices 146a and 146b are not required to capture image frames, the power source 186 may be turned OFF, such that the film layer 184 may act as a non-transparent diffusive element, diffusing visible light emitted from the LEDs 182.

When video conferencing display device 140 is conditioned to operate in the display mode, power source 186 is turned OFF causing film layer 184 to operate as a diffusive element, diffusing visible light emitted by the LEDs 182. As mentioned above, when in the display mode, the imaging devices 146a and 146b are powered OFF. In contrast, when the video conferencing display device 140 is conditioned to operate in the image capture mode, power source 186 applies an electric field to the film layer 184, causing film layer 184 to become transparent. As will be appreciated, when in the capture mode, the imaging devices 146a and 146b are powered ON.

The operation of the film layer 184 is synchronized to that of the imaging devices 146a and 146b and thus, switching of the film layer 184 between transparent and non-transparent states is performed at a rate that matches the frame rate of the imaging devices 146a and 146b.

Figure 7:
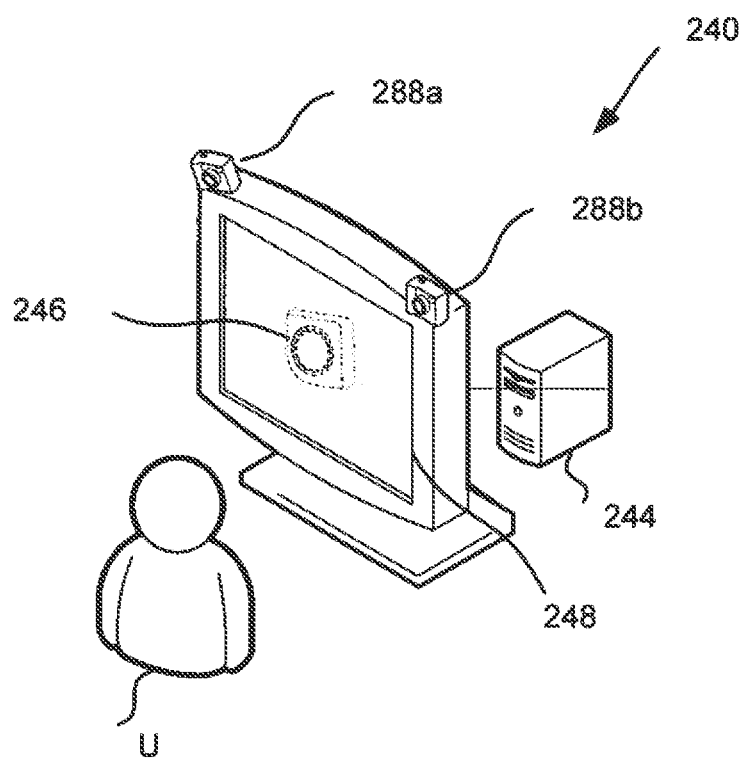
FIG. 7 is a schematic diagram of yet another embodiment of a video conferencing display device.

Turning now to FIG. 7, yet another embodiment of video conferencing display device is shown. In this embodiment, like reference numerals will be used to indicate like components of the first embodiment with a "200" added for clarity. As can be seen, video conferencing display device 240 is similar to the video conferencing display device 40 shown in FIG. 3. In this embodiment however, the imaging device 246 is an infrared (IR) imaging device. Also, two visible light imaging devices 288a and 288b are positioned adjacent the top right and top left corners of the display panel 248.

Figure 8:
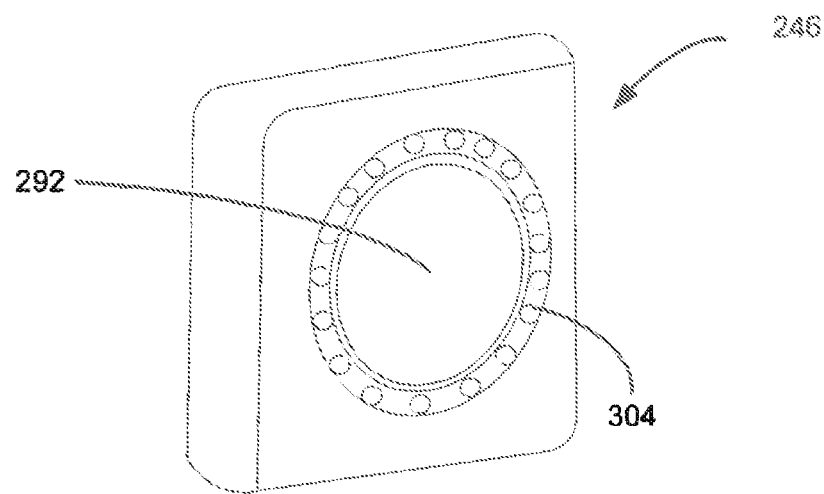
FIG. 8 is a perspective view of an imaging device forming part of the video conferencing display device of FIG. 7.
Figure 9:
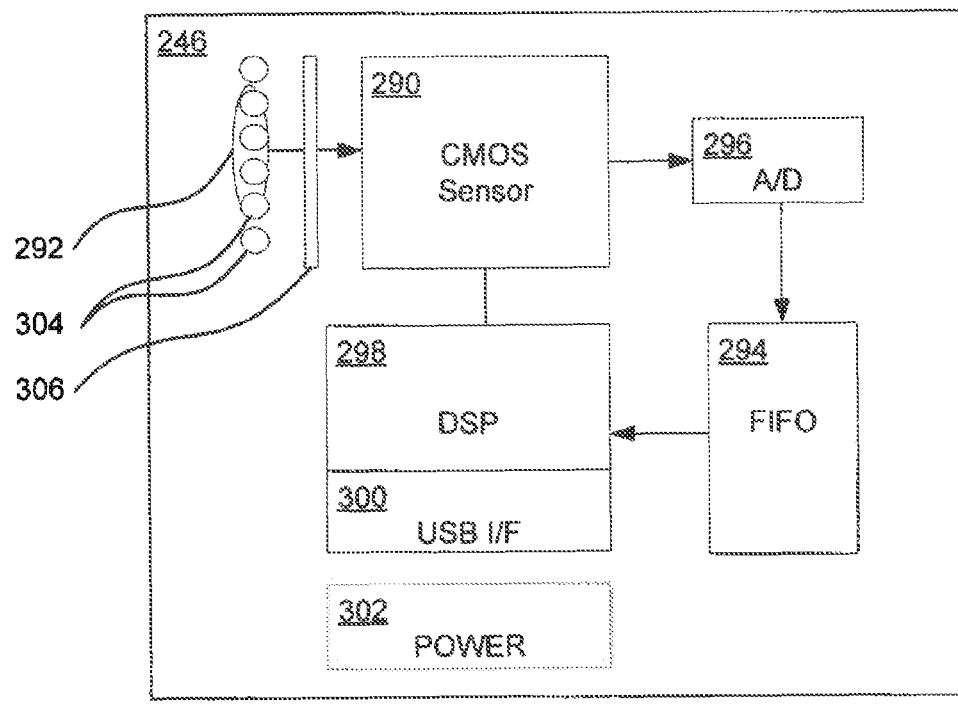
FIG. 9 is a schematic block diagram showing components of the imaging device of FIG. 8.

FIGS. 8 and 9 further illustrate IR imaging device 246. Similar to the imaging device 46 of FIG. 4, imaging device 246 comprises a two-dimensional camera image sensor 290, an associated lens assembly 292 and an IR filter 306. As will be appreciated, IR filter 306 allows IR illumination to pass through to the image sensor 290 while blocking out other wavelengths of illumination such as visible light. An IR illumination source is also associated with the image sensor 290. The IR illumination source comprises a plurality of IR LEDs 304 that are circumferentially spaced about the periphery of the lens 292. The image sensor 290 is connected to a FIFO buffer 294 via an A/D converter 296. The imaging device 246 also comprises a DSP 298, and an input-output interface 300 as well as volatile and non-volatile memory (not shown).

In comparison to video conferencing display device 40, the use of an IR imaging device 246 and IR LEDs 304 with video conferencing display device 240 does not require the use of a transparent display panel. In this embodiment, the general purpose computing device 244 and IR imaging device 246 are used to track the pupils of a user using known eye-tracking techniques.

Infrared light emitted from IR LEDs 304 is at least partially reflected from the eyes of a user U back towards the IR imaging device 246. In the visible light spectrum, this effect is commonly known as the red eye effect. The IR imaging device 246 captures IR images and communicates these captured images to the general purpose computing device 244. The general purpose computing device 244 processes the received IR images to track eye movement and rotation from changes in corneal reflection, the center of the pupil and/or reflections from the back of the eye lens using known eye tracking techniques.

As mentioned above, the video conferencing display device 240 comprises two visible light imaging devices 288a and 288b are positioned adjacent the top right and top left corners of the display panel 248. The visible light imaging devices 288a and 288b also capture images of the user U and communicate the captured images to the general purpose computing device 244. The general purpose computing device 244 processes the received visible light images using know facial recognition techniques and, with the eye tracking data obtained by processing the IR images, the general purpose computing device 244 forms an image of user U for transmission to a remote display such that the appearance of direct eye contact is established.

Figure 10:
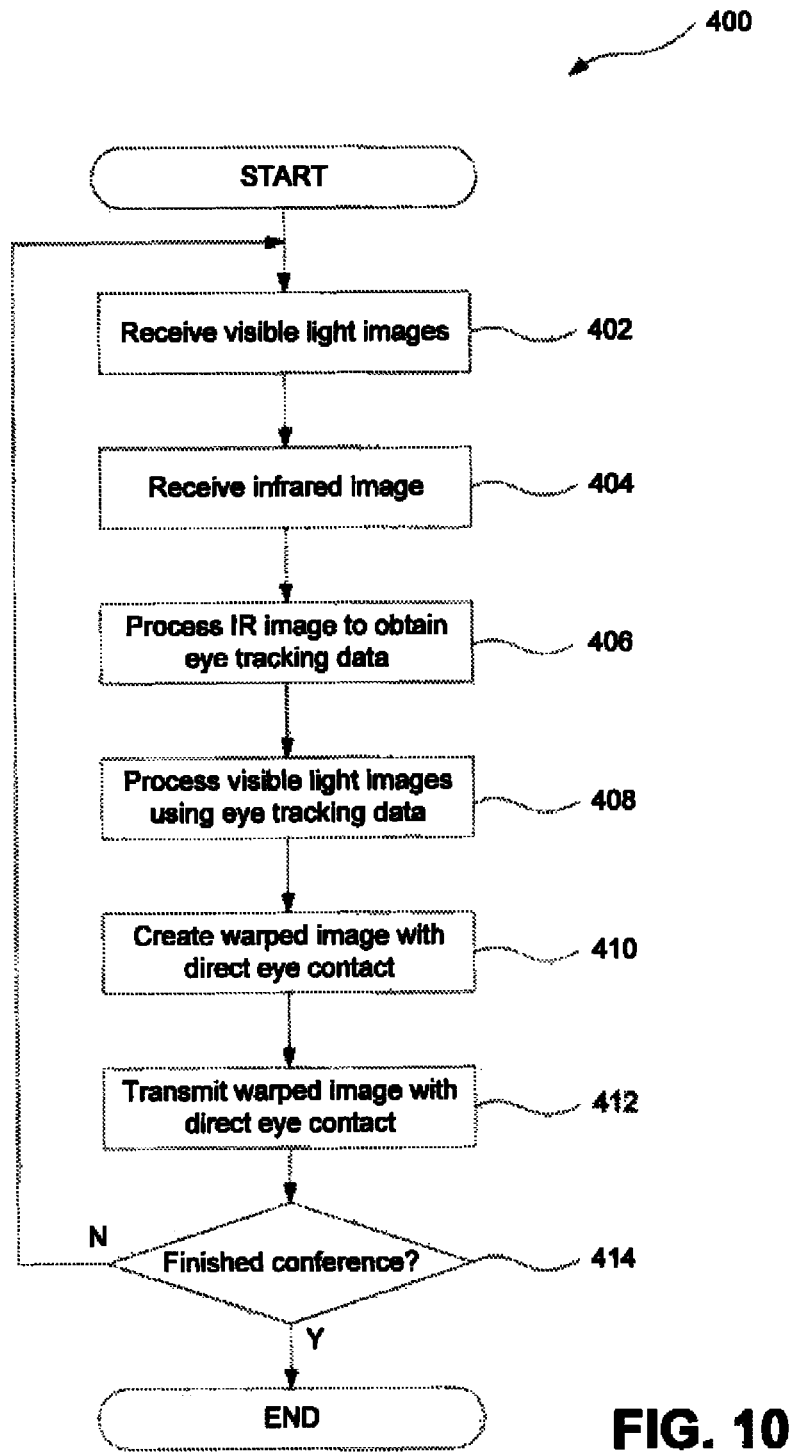
FIG. 10 is a flowchart showing a method of processing visible light images and infrared (IR) images to obtain an image with the appearance of direct eye contact.

Turning now to FIG. 10, a flowchart showing a method of processing the visible light images and IR images performed by the general purpose computing device 244 is shown and is generally identified by reference numeral 400. Method 400 begins in the event a video conferencing session is established and the general purpose computing device 244 receives visible light images from visible light imaging devices 288a and 288b (step 402). An infrared image is also from IR imaging device 246 (step 404). The infrared image is processed to obtain eye tracking data (step 406). The visible images are then processed using the eye tracking data obtained from the infrared image (step 408) to create a warped image of the user U having the appearance of direct eye contact (step 410). An exemplary method used during step 410 is described in the publication entitled "Real-time software method for preserving eye contact in video conferencing", authored by Tsai, Y. P., Kao, C. C., Hung, Y. P., and Shih, Z. C. *Journal of information science and engineering*, vol. 20 (5), Sep. 2004, pp 1001-1017, the entire content of which is incorporated herein by reference. The warped image having the appearance of direct eye contact is then sent to a remote video conferencing device over a communications network (step 412). A check is then performed to determine if the video conferencing session is complete (step 414). If the video conferencing session is not complete, the method returns to step 402. If the video conferencing session is complete, the method ends.

Figure 11:
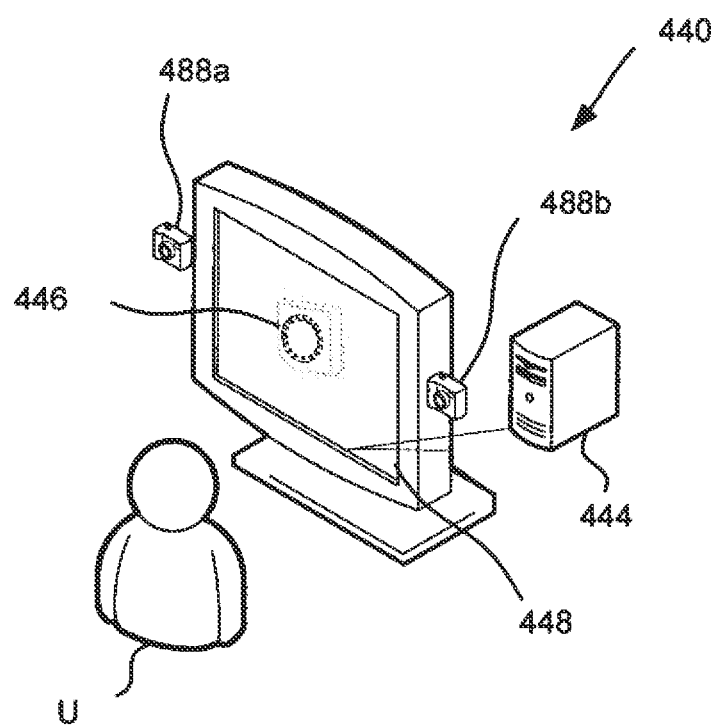
FIG. 11 is a schematic diagram of yet another embodiment of a video conferencing display device.

Turning now to FIG. 11, yet another embodiment of a video conferencing display device is shown and is identified by reference numeral 440. In this embodiment, like reference numerals will be used to indicate like components of the embodiment shown in FIG. 7, with a "200" added for clarity. As can be seen, video conferencing display device 440 is similar to the video conferencing display device 240 shown in FIG. 7 with the exception that the two visible light imaging devices 488a and 488b are positioned at an approximate midpoint along the right and left sides of the display panel 448. The video conferencing operation of video conferencing display device 440 is similar to that of video conferencing display device 240 and as such, the specifics will not be further described.

Although embodiments described above with reference to FIGS. 7 and 11 utilize two visible light imaging devices, those skilled in the art will appreciate that additional visible light imaging devices may be used such as for example four imaging devices positioned adjacent corners of the video conferencing display device.

Figure 12:
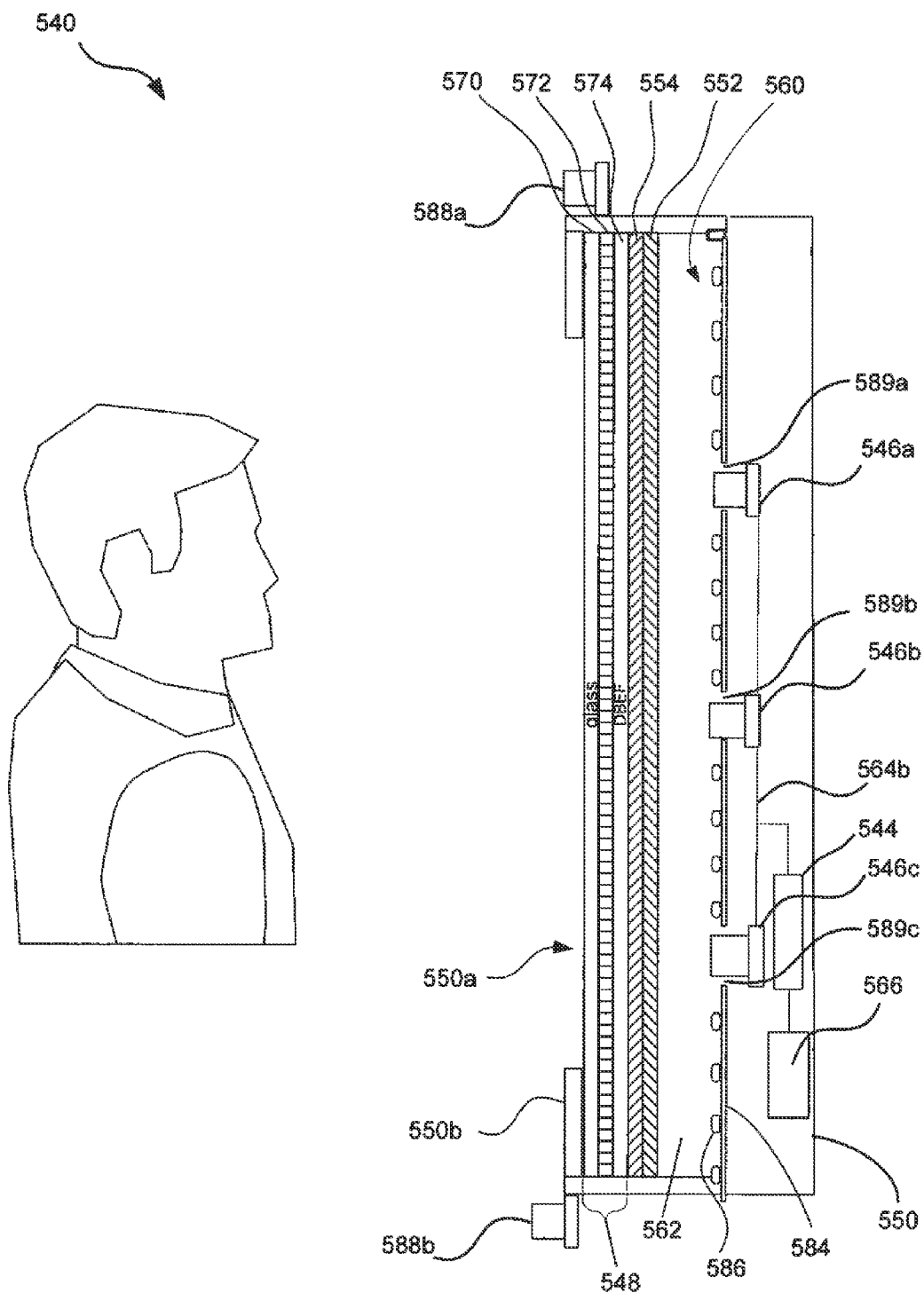
FIG. 12 is a cross-sectional view of yet another embodiment of a video conferencing display device.

Turning now to FIG. 12, yet another embodiment of a video conferencing display device is shown. In this embodiment, like reference numerals will be used to indicate like components of the embodiment shown in FIG. 5, with a "400" added for clarify. As can be seen, video conferencing display device 540 is similar to that of video conferencing display device 140. In this embodiment, however, the backlight illumination source 560 comprises a direct backlight board 584 having an array of LEDs 586 positioned about the upper surface thereof. The LEDs 586 emit visible light rays though the interior space 562 and support layer 552, towards the diffuser 554. The diffuser, in turn, diffuses the visible light rays thereby to provide the display panel 548 with suitable backlighting and illuminate the image displayed thereon. Further, the video conferencing display device 540 comprises three (3) IR imaging devices 546a, 546b and 546c and two (2) visible imaging devices 588a, 588b. The direct backlight board 584 is provided with openings 589a, 589b and 589c corresponding to the locations of imaging devices 546a, 546b and 546c, to ensure that the field of view of each imaging device is not obstructed. The operation of video conferencing display device 540 is similar to video conferencing display device 240 and thus the specifics will not be described further.

In another embodiment, video conferencing display device 540 may be provided with film layers having electrically controllable transparency such as for example PDLC film positioned adjacent the openings 589a, 589b and 589c. In this embodiment, the film layers may be controlled during image capture in the manner described above.

Figure 13:
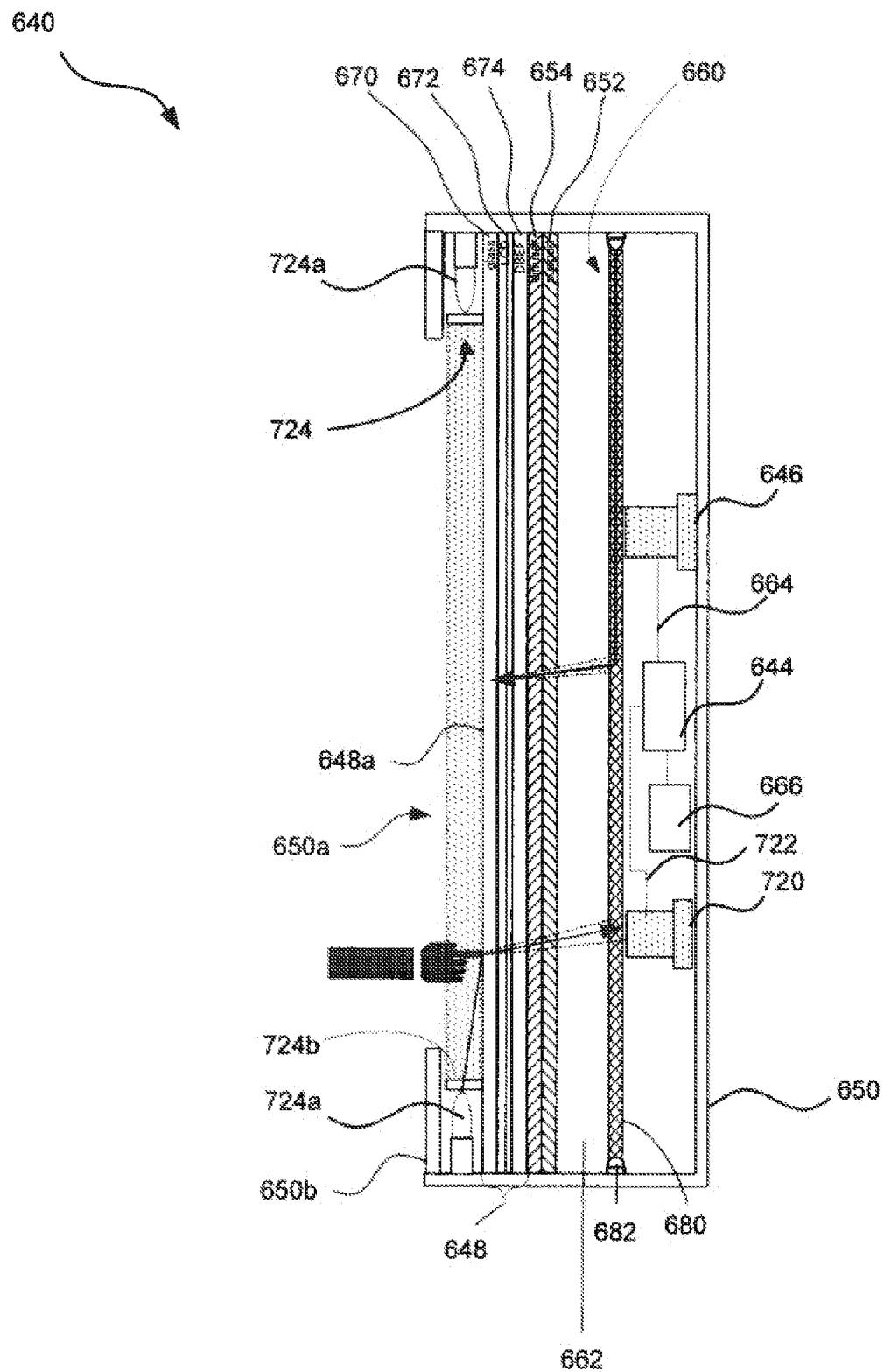
FIG. 13 is a cross-sectional view of still yet another embodiment of a video conferencing display device.

Turning now to FIG. 13, yet another embodiment of a video conferencing display device is shown. In this embodiment, like reference numerals will be used to indicate like components of the embodiment shown in FIG. 3, with a "600" added for clarify. As can be seen, video conferencing display device 640 is similar to that of video conferencing display device 40 with the addition of infrared touch detection. The infrared touch detection is achieved through use of an IR imaging device 720 and an IR illumination source 724.

The imaging device 720 is connected to general purpose computing device 644 via a data communication link such as a USB cable 722. The imaging device 720 is positioned below the backlight illumination source 660 and is oriented such that its field of view (FOR) is aimed at the inner surface of the display panel 648. As mentioned previously, the general purpose computing device 644 provides display data to circuit block 666 which in turn provides the display data to the display panel 648 via an HDMI cable or other suitable connection (not shown). The display panel 648 in turn displays an image thereon. The general purpose computing device 644 processes image data captured by the imaging device 720 to detect one or more characteristics and the location of each pointer brought into proximity with the outer surface 648a of the display panel 648 and updates display data provided to the display panel 648, if appropriate, so that the image presented on display panel 648 reflects pointer activity. In this manner, pointer activity in proximity with the outer surface 648a of the display panel 648 can be recorded as writing or drawing or used to control execution of one or more application programs executed by the general purpose computing device 644.

The IR illumination source 724 in this embodiment comprises a plurality of IR light emitting diodes (LEDs) 724a and a holographic diffuser 724b positioned beneath the bezel 650b. The LEDs 724a are positioned at spaced location about the periphery of the opening 650a. The holographic diffuser 724b also extends about the periphery of the opening 650a. The holographic diffuser 724b diffuses IR light rays emitted by the IR LEDs 724a such that at least a portion of the IR light rays exiting the diffuser 724b extend generally parallel to the outer surface 648a of the display panel 648. In this embodiment, the holographic diffuser 724b is of the type manufactured by Wavefront Technologies, Inc. of Paramount, Calif., USA, of the type manufactured by RPC Photonics, Inc., Rochester, N.Y., USA, or of the type manufactured by Fusion Optix Inc. of Woburn, Mass., USA. Of course, other suitable infrared diffusers may be employed.

In the event one or more pointers are brought into proximity with the outer surface 648a of the display panel 648, IR illumination emitted across the outer surface 648a of the display panel 116 by IR illumination source 724 is reflected by each such proximate pointer. For each such proximate pointer, at least a portion of the reflected IR illumination is directed through the display panel 648, diffuser 654 and support layer 652 towards the imaging device 720. The redirected IR illumination impinging on the imaging device 720 is captured in acquired image frames. Image data of acquired image frames is sent to the general purpose computing device 644 via USB cable 722, where the image data is processed to determine one or more characteristics and the location of each pointer with respect to the outer surface 648a of the display panel 648 using known image processing routines such as for example blob detection and morphology operations (edge detection, binarization, etc.). The general purpose computing device 644 in turn adjusts display data output to the display panel 648 via the circuit block 666, if appropriate, such that the image presented on the display panel 648 reflects pointer activity. As will be appreciated, the general purpose computing device 644 may provide the touch data to a remote device over a communications network such that the image presented on the remote display device reflects pointer activity.

Above-incorporated U.S. Provisional Application No. 61/470,440 to Morrison et al. discloses many equivalent variations that may also be adapted for use in a video conferencing system described herein.

Although embodiments are described above wherein the general purpose computing device polls the imaging device to obtain image data, those skilled in the art will appreciate that alternatives are available. For example, in another embodiment the imaging device sends an interrupt signal to the general purpose computing device in the event a predetermined amount of image data is available. Upon receipt of the interrupt, the general purpose computing device requests the image data and thus the image data is communicated thereto.

Although embodiments are described above wherein IR images are processed to locate track the positions of a user's eye, those skilled in the art will appreciate that visible light images may be processed to track the positions of a user's eye.

As will be appreciated, facial recognition techniques may be employed by the general purpose computing device, within the DSPs associated with the imaging devices, or as a combination of the general purpose computing device and the DSPs.

Although embodiments are described above wherein film layers having electrically controllable transparency are used to achieve a shuttering effect, those skilled in the art will appreciate that the display panel may be configured to achieve the shuttering effect.

Although embodiments are described above with reference to the accompanying drawings, those skilled in the art will appreciate that variations and modifications may be made without departing from the scope thereof as defined by the appended claims.

What is claimed is:

1. A video conferencing display device comprising:
   a display panel;
   an illumination source providing illumination through the display panel such that when a user is positioned adjacent to an outer surface of the display panel, the user's eyes reflect illumination from the illumination source back through the display panel;
   at least one first imaging device having a field of view aimed at an inner surface of the display panel, each first imaging device capturing images through the display panel including illumination reflected by the user's eyes through the display panel;
   at least one second imaging device having a field of view such that when a user is positioned adjacent to an outer surface of the display panel, an image of the user appears in the captured images of each second imaging device; and
   processing structure in communication with the at least one first and at least one second imaging devices, said processing structure processing the images captured by each first imaging device to obtain eye tracking data and processing the images captured by each second imaging device using the eye tracking data to create a direct eye image for transmission to a remote device over a network.

2. The video conferencing display device of claim 1 wherein the processing structure is configured to receive images from the remote device over the network, displays the received images being displayed on the display panel.

3. The video conferencing display device of claim 1 wherein the at least one first imaging device is an infrared imaging device.

4. The video conferencing display device of claim 3 wherein the illumination source is an infrared illumination source.

5. The video conferencing display device of claim 1 wherein the at least one second imaging device is a visible light imaging device.

6. The video conferencing display device of claim 1 wherein the at least one second imaging device comprises two second imaging devices, the two second imaging devices capturing images of the outer surface of the display panel from different vantages.

7. A method comprising:
   providing illumination towards an outer surface of a display device using a first illumination source;
   capturing images of a user positioned adjacent to the outer surface of the display device using at least one first imaging device having a field of view aimed at an inner surface of the display panel including illumination from the first illumination source reflected by the user's eyes towards the first imaging device;
   capturing images of the user positioned adjacent to the outer surface of the display using at least one second imaging device having a field of view such that when the user is positioned to the outer surface of the display panel, an image of the user appears in the captured images; and
   processing images captured by the at least one first imaging device to obtain eye tracking data and processing the images captured by the at least one second imaging device using the eye tracking data to create a direct eye image for transmission to a remote device over a network.

8. The method of claim 7 further comprising receiving images from the remove device over the network, and displaying the received images on the display device.

9. A video conferencing system comprising at least two video conferencing display devices communicating over a network, at least one of the video conferencing display devices being in accordance with claim 1.

* * * * *